No. 783,907. PATENTED FEB. 28, 1905.
J. W. STEVENS.
CONVEYER AND DISTRIBUTER.
APPLICATION FILED NOV. 11, 1903.
5 SHEETS—SHEET 1.
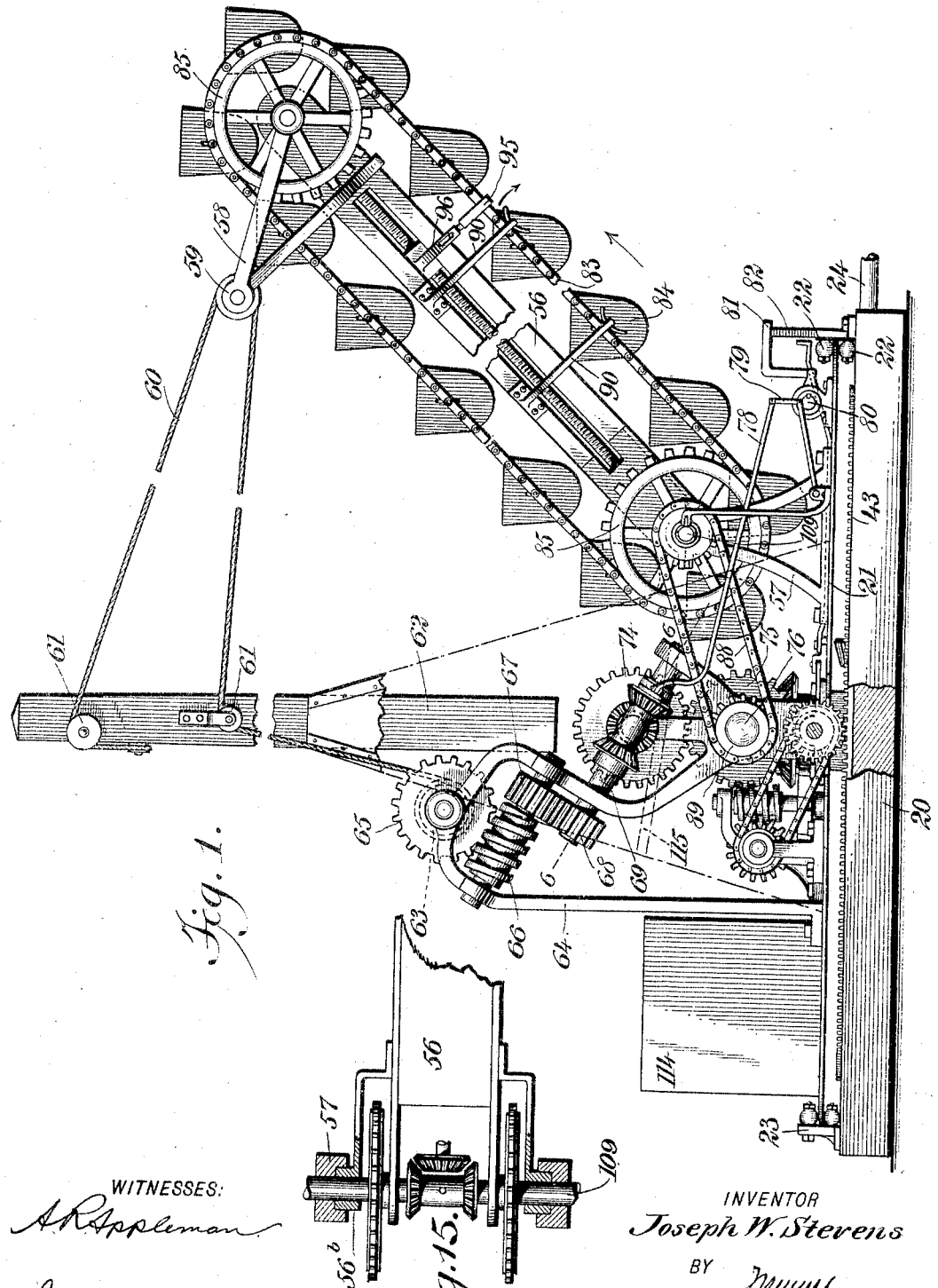
WITNESSES:
INVENTOR
Joseph W. Stevens
BY
ATTORNEYS No. 783,907. PATENTED FEB. 28, 1905.
J. W. STEVENS.
CONVEYER AND DISTRIBUTER.
APPLICATION FILED NOV. 11, 1903.
5 SHEETS—SHEET 2.
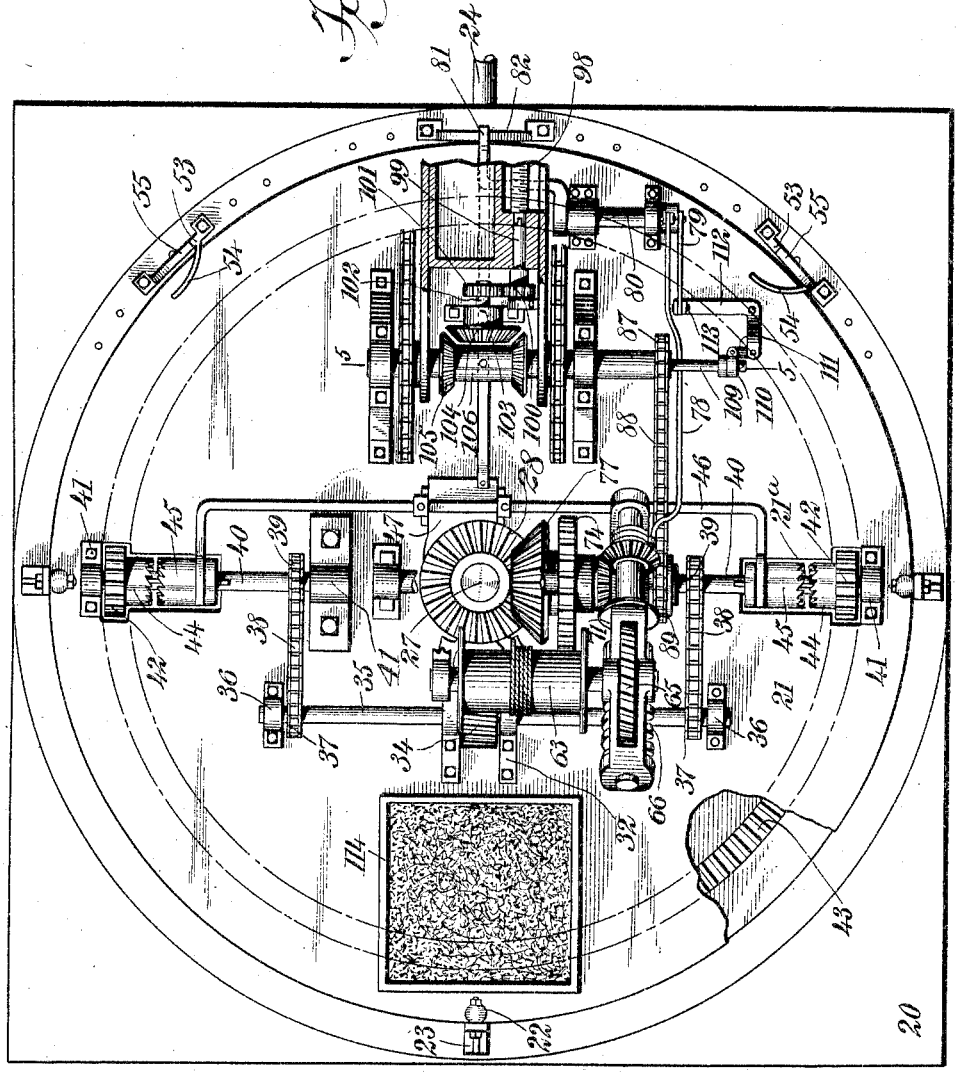
WITNESSES:
A. R. Appleman
Isaac B. Owens.
INVENTOR
Joseph W. Stevens
BY
ATTORNEYS No. 783,907. PATENTED FEB. 28, 1905.
J. W. STEVENS.
CONVEYER AND DISTRIBUTER.
APPLICATION FILED NOV. 11, 1903.
5 SHEETS—SHEET 3.
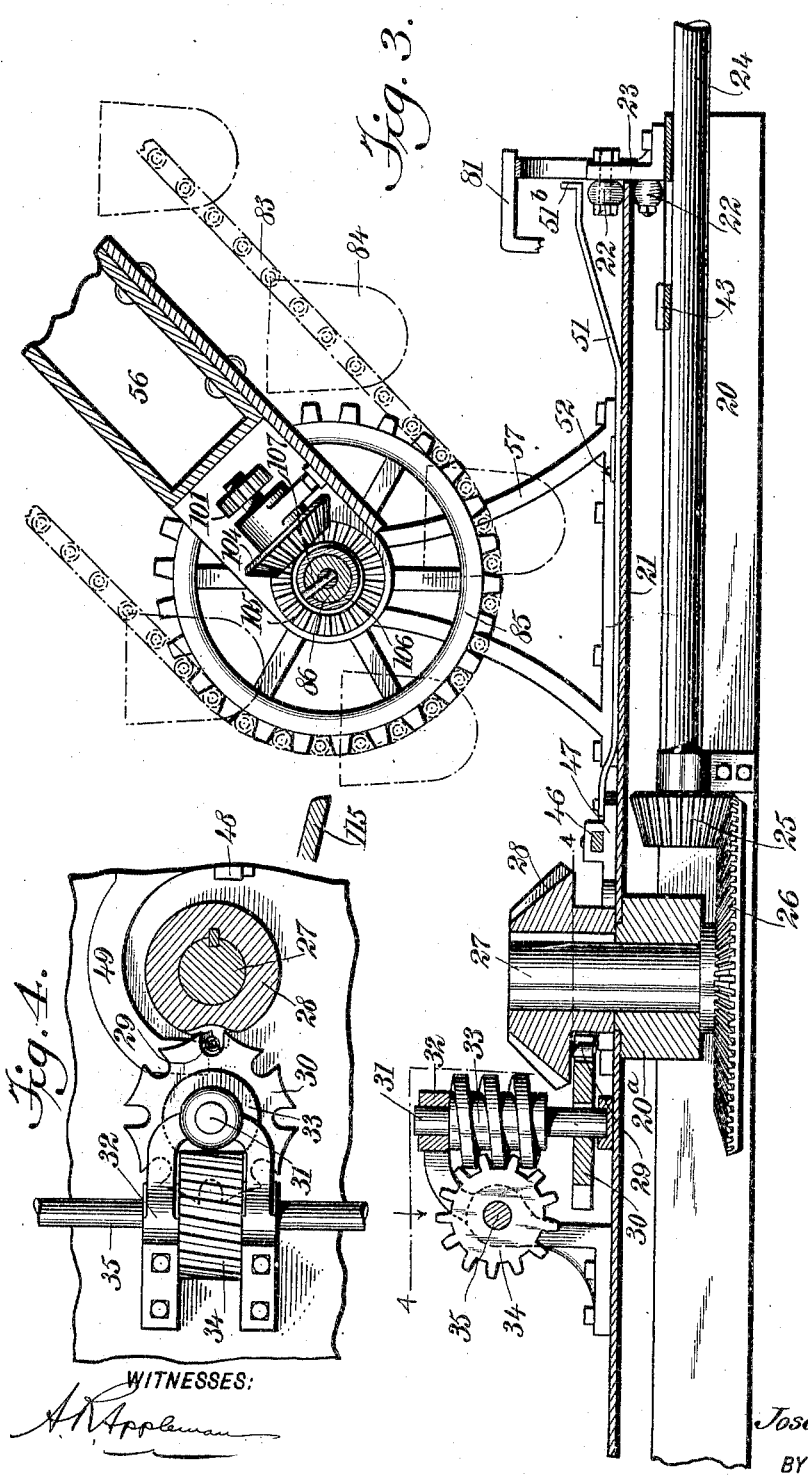
WITNESSES:
INVENTOR
Joseph W. Stevens
BY
ATTORNEYS No. 783,907. PATENTED FEB. 28, 1905.
J. W. STEVENS.
CONVEYER AND DISTRIBUTER.
APPLICATION FILED NOV. 11, 1903.
5 SHEETS—SHEET 4.
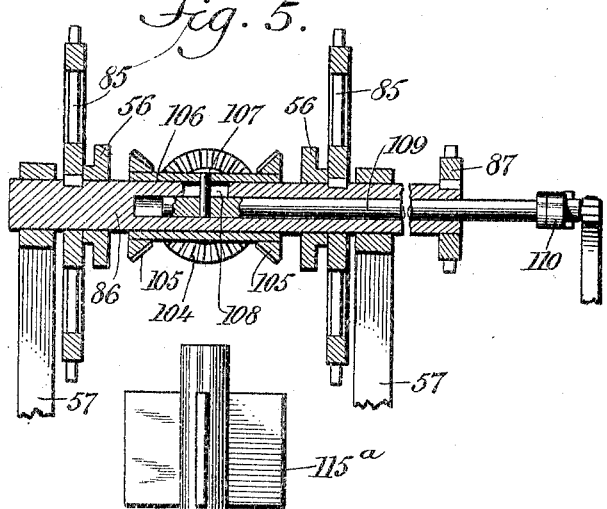
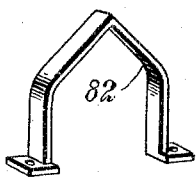
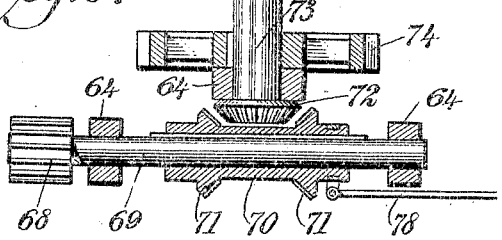
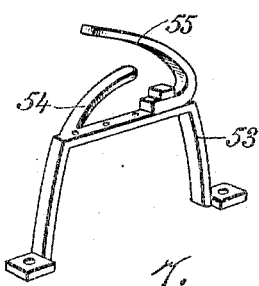
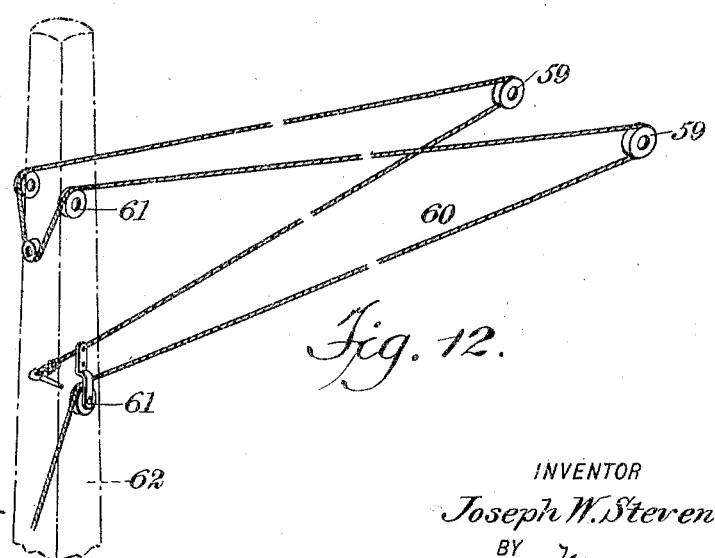
WITNESSES:
A. R. Appleman
Isaac B. Owens
INVENTOR
Joseph W. Stevens
BY
ATTORNEYS

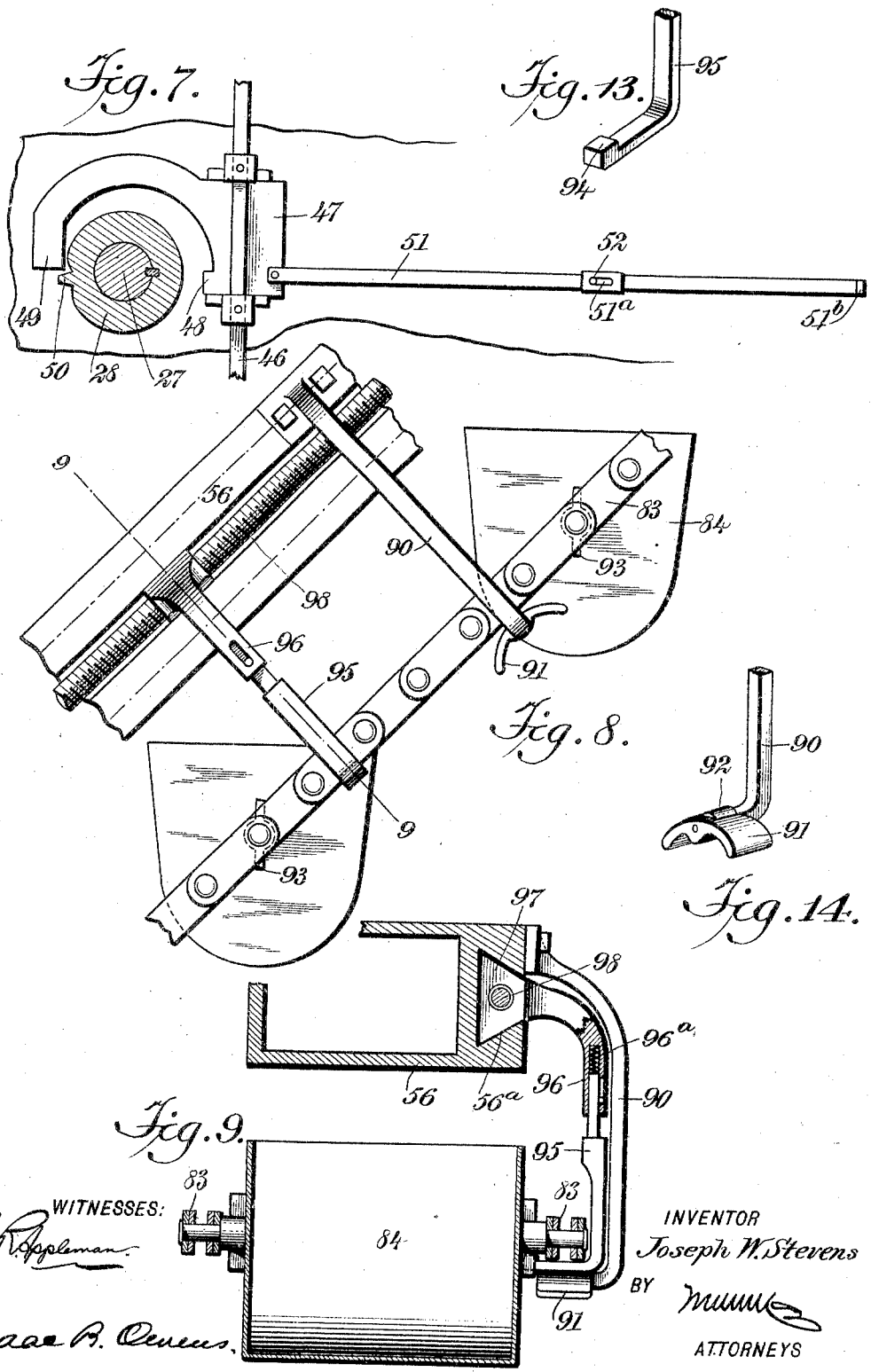

No. 783,907. Patented February 28, 1905.

UNITED STATES PATENT OFFICE.

JOSEPH WILLEY STEVENS, OF TRENTON, NEW JERSEY.

CONVEYER AND DISTRIBUTER.

SPECIFICATION forming part of Letters Patent No. 783,907, dated February 28, 1905.

Application filed November 11, 1903. Serial No. 180,713.

*To all whom it may concern:*

Be it known that I, JOSEPH WILLEY STEVENS, a citizen of the United States, and a resident of Trenton, in the county of Mercer and State of New Jersey, have invented a new and Improved Conveyer and Distributer, of which the following is a full, clear, and exact description.

This invention relates to an apparatus intended particularly for handling concrete, but useful in connection with various other materials, as will be apparent.

It comprises, generally speaking, a boom on which is arranged a conveyer, and mechanism for automatically swinging and raising the boom, so as to deposit the material handled by the conveyer at any desired point within the range of the machine.

This specification is an exact description of one example of my invention, while the claims define the actual scope thereof.

Reference is to be had to the accompanying drawings, forming a part of this specification, in which similar characters of reference indicate corresponding parts in all the views.

Figure 1 is a side elevation of the invention. Fig. 2 is a sectional plan thereof. Fig. 3 is an enlarged section of the main driving-gear and the inboard end of the conveyer. Fig. 4 is a sectional plan on the line 4 4 of Fig. 3. Fig. 5 is a section on the line 5 5 of Fig. 2. Fig. 6 is a section on the line 6 6 of Fig. 1. Fig. 7 is a plan view of the mechanism for automatically reversing the movement of the table. Fig. 8 is an enlarged detail of the conveyer-boom and the tripping-arm and screw. Fig. 9 is a cross-section on the line 9 9 of Fig. 8. Fig. 10 is a detail perspective of the intermediate tripping-cam. Fig. 11 is a detail perspective of one of the end tripping-cams. Fig. 12 is a diagrammatic view showing the hoisting-rope for the conveyer-boom. Fig. 13 is a detail perspective view of the lower end of the tripping-arm. Fig. 14 is a detail perspective view of the lower end of one of the chain-supports of the conveyer, and Fig. 15 is a detail section of a modification.

20 indicates the base of the apparatus, on which is mounted to turn the circular table 21, guided by rollers 22, engaged with its periphery and mounted through brackets 23 on the base 20.

24 indicates the drive-shaft which carries the miter-gear 25 in mesh with a corresponding gear 26, fastened on the perpendicular stub-shaft 27, which is mounted to turn independently of the table 21 in a part 20$^a$ of the base. The shaft 27 carries fast thereto above the table 21 a bevel-gear 28, and this is provided on its under side with a stud 29, which works with a star-wheel 30 to impart a step-by-step rotary movement to the latter. Said star-wheel is mounted on a shaft 31, carried in a bracket 32, rising from the table 21, and 33 indicates a worm fastened to the shaft 31 and meshed with a worm-wheel 34 on a horizontal shaft 35. This shaft is revolubly mounted in bearings 36 on the table 21 and carries at each end a sprocket-wheel 37. Over these wheels chains 38 run to wheels 39, fast, respectively, on the shafts 40. Said shafts 40 are revolubly mounted in bearings 41, attached to the table 21, and have loose thereon gears 42, which extend through orifices 21$^a$ in the table 21 and mesh with a circular rack 43, fastened on the base 20.

44 indicates clutch members connected with the gears 42, and 45 indicates coacting clutch members splined on the respective shafts 40. By engaging together the members of either pair of these clutches the corresponding gear 42 will be rendered fast on its shaft, and by adjusting these clutch members the direction in which the table 21 is turned may be regulated.

The clutches are automatically operated to reverse the table by means of a transverse arm 46, engaged with the clutch members 45 and having sliding connection with a block 47. Said block, as best shown in Fig. 7, has a shoulder 48 thereon and an arm 49 lying opposite the shoulder, and the hub of the gear 28 on the shaft 27 is provided with a stud 50, adapted alternately to strike the arm 49 and shoulder 48, thereby imparting a back-and-forth movement to the block, which, through the means of the rod 46, results in alternately shifting the clutch 45. In order to impart this transverse movement to the block 47 through the stud 50 on the gear 28, it is necessary to impart a longitudinal movement to the block, so as to bring the shoulder 48 and the arm 49 successively into the path of the projection 50. This longitudinal shifting of the block is effected by means of a rod 51, having a slot 51ª therein, in which is loosely fitted a pin 52, this pin being fastened to the table 21 and the rod 51 projecting forward to the front edge of the machine, as best shown in Fig. 3. Mounted adjustably at the front side portions of the base 20 are the trip devices. (Illustrated in Fig. 11.) These devices comprise a stand 53, having a horizontal cam 54 for reciprocating the rod 51 and a vertical cam 55 for a purpose which will be hereinafter set forth. The trip devices being located at the desired position, as the table swings to one side the rod 51 engages the horizontal cam 54, and the said rod is pushed inward, thus throwing the shoulder 48 in the path of the projection 50 and allowing the block 47 to be moved in one direction. This reverses the movement of the table, and as the table swings back to the other side the rod 51 strikes the reversed horizontal cam 54, and said rod, with its attached block 47, is drawn back to the position shown in Fig. 7, whereupon the arm 49 is connected with the stud 50, and the block 47 is moved in the opposite direction, again reversing the movement of the table. It will thus be seen that by means of the trip devices the table is given a steady swinging movement the scope of which may be regulated at will by adjusting the position of the trip devices on the base 20.

The conveyer-boom 56 is mounted to swing in a vertical plane on pedestals 57, carried on the table 21, and said boom has at its free end a sling 58, carrying one or more sheaves 59, over which is rove the cable 60. Said cable is also rove over sheaves 61 on a mast 62, suitably sustained on the table, and from the mast the cable passes down to a reel 63, mounted in brackets 64, sustained on the table 21. Said reel has a worm-wheel 65 attached thereto and in mesh with a worm 66, mounted in one of the brackets 64. The worm 66 is connected by pinions 67 and 68 with a shaft 69, mounted in one of the brackets 64. Said shaft has splined thereon a sleeve 70, carrying two oppositely-facing bevel-pinions 71, adapted to be alternately meshed with a bevel-pinion 72, keyed to a short shaft 73, mounted in a part of one of the brackets 64 and carrying also a spur-gear 74 in mesh with a spur 75 on a horizontal shaft 76, which itself is revolubly carried in a part of one of the brackets 64. Said shaft 76 carries a bevel-pinion 77, (see Fig. 2,) and this is in mesh with the pinion 28 before described. By this train of gear elements the reel 63 is driven.

It will be observed that by shifting the before-described sleeve 70 the direction of rotation of the shaft 69, and consequently of the reel 63, may be regulated at will. This sleeve 70 is automatically shifted by devices which will now be described.

78 indicates a rod which is attached to the sleeve 70 and extends forward to a crank-arm 79 on a rock-shaft 80, mounted at the front side of the table 21. Said rock-shaft has a crank-arm 81 attached thereto, and this crank-arm projects forwardly in position to engage the trip-cam 82, which is fastened to the base in the longitudinal center of the machine. As the crank-arm 81 rides over the trip-cam 82 the shaft 80 is rocked in one direction, thus reversing the movement of the reel 63. As the table continues its movement the said arm 81 runs under the vertical cam 55 of the trip 53, and the arm 81 is thereupon thrown downward, again reversing the movement of the reel 63. It will be observed, therefore, that the movement of this reel is reversed at the end of each movement of the table and at the middle of said movement. The purpose of this movement is to enable the contents of the conveyer to be dumped in a straight line as contradistinguished from the arc in which the end of the conveyer would naturally swing owing to the movements of the table 21. In order to compensate for this arc-like movement of the conveyer, I simultaneously impart to the conveyer a rising-and-falling movement, the net result of these movements being a movement of the outer end of the conveyer-boom in a straight line. The reel 63 acting on the rope 60 alternately raises and drops the boom, and the above-described trip and reversing devices automatically actuate the reel. Therefore as the conveyer swings in a horizontal arc its outer end is simultaneously raised and lowered, the highest point of the vertical movement being when the conveyer reaches the longitudinal center of the machine and the lowest point being at the ends of the movement of the table.

The conveyer has two bucket-chains 83, carrying pivoted buckets 84. Said chains 83 run over sprocket-wheels 85, the lower of which, as best shown in Fig. 5, are keyed to a hollow shaft 86, mounted in the brackets 57 (before described) and forming the axle around which the conveyer-boom swings in its vertical movement. Said tubular shaft 86 carries a sprocket-wheel 87, over which runs a chain 88 to a sprocket-wheel 89, fastened to the shaft 76 before described, and through this mechanism the necessary rotary movement is imparted to the shaft 86.

Fastened to each side of the boom 56 are a number of chain-supports comprising arms 90, the lower ends of which are turned laterally and provided with shoes 91 (see Fig. 14) and rollers 92, which bear under the lower runs of the bucket-chains and prevent the same from sagging. The buckets are provided with studs 93 adjacent to their pivots, as shown best in Fig. 8, and these studs are adapted to engage the projection 94 on the lower member 95 of the bucket-trip. (See Fig. 13.) The lower member 95 of the bucket-trip has jointed connection with the upper member 96, which has a dovetail slide 97 running in a longitudinal slideway 56ª in the boom 56. 96ª indicates a spring to hold the lower member 95 yieldingly downward. Said slide 97 is engaged with a screw 98, which is revolubly mounted in the aforesaid slideway of the boom. As shown best in Fig. 2, the inner end of the said screw 98 is connected with a shaft-section 99, so as to turn the screw from the shaft-section, and the shaft-section is revolubly mounted in the inner end of the boom. Fastened to the inner end of the shaft-section 99 is a pinion 100, and this in turn is meshed with a pinion 101, fastened on a short longitudinal shaft 102. Said shaft is mounted in a bearing 103, rising from the base 20, and carries at its rear end a bevel-pinion 104, which may be meshed with either one of two oppositely-set bevel-pinions 105, carried on a sleeve 106, which is mounted on the shaft 86. Said sleeve has a pin 107 passing through it, and this pin plays in a slot 108 in the tubular shaft 86 and extends into connection with a rod 109, which is slidably fitted within the tubular shaft 86. By longitudinally reciprocating the rod 109 the sleeve 106 may be shifted to engage either one of the gears 105 with the gear 104. Said rod 109 has a loose collar 110, to which is attached, by means of a link 111, one arm of an elbow-lever 112. The other arm of said lever is connected by a link 113 with the before-mentioned crank-arm 79 of the shaft 80. As this shaft 80 is rocked by the action of the trip devices before described the devices 113, 112, 111, and 110 impart a reciprocating motion to the rod 109, and by this means the gears 105 are shifted. Said gears are revolubly driven from the shaft 86, and by means of the gears 104, 101, and 100 the parts 99 and 98 are rotated. This rotation is continuous, subject, however, to the reversal effected by the shaft 109 and its coacting parts. It will be seen, therefore, that throughout the operation of the machine the screw 98 is being driven first in one direction and then in the other, causing the bucket-trip to move back and forth along the boom. As the projections 93 of the buckets 84 move into engagement with said trip device the buckets are dumped, and by keeping the trip device in motion along the boom the point at which the buckets are dumped is constantly changing, and in this manner the material will be distributed over a belt the width of which is equal to the scope of movement of the bucket-trip.

The ratio of the gears 100 and 101 may be changed at will, and by this means the speed and scope of the movement of the bucket-trip may be regulated.

114 indicates a hopper for the material being handled, and 115 indicates a chute or slide, (see the dotted lines in Fig. 1 and the full lines in Fig. 3,) which chute passes from the hopper 114 to the boot of the conveyer. As shown in Fig. 6, the shaft 73 may be extended and arranged with blades 115ª, which work over the chute 115 to feed the material. In practice one or more workmen will stand at the hopper and shovel the material therefrom onto the chute or slide 115, from which it passes directly to the conveyer. After the various parts have been once set or adjusted the operation is entirely automatic, excepting in so far as concerns the loading of the bucket.

In the use of the apparatus after an adjustment of the various trips to give the conveyer the movement desired it is only necessary to start the shaft 24 and to keep the conveyer-buckets loaded. The conveyer swings from side to side and rises and falls as desired, and the buckets are dumped at different points along the boom, thus distributing the material uniformly over the surface within the range of movement of the conveyer.

Fig. 15 shows a modification by which the sprocket-shaft 109 is relieved of the strain of the boom 56. This is accomplished by forming hollow trunnions 56ᵇ on the boom, which trunnions are mounted in the bearings 57 and have the shaft 109 passed loosely through them.

Various changes in the form, proportions, and minor details of my invention may be resorted to at will without departing from the spirit and scope thereof. Hence I consider myself entitled to all such variations as may lie within the intent of my claims.

Having thus described my invention, I claim as new and desire to secure by Letters Patent—

1. The combination of a conveyer, means for mounting the same, means for swinging the conveyer in an arc and means for automatically and simultaneously raising and lowering the same.

2. The combination of a conveyer, means for mounting the same, means for moving the conveyer in a curved path and means for automatically and simultaneously raising and lowering the same.

3. The combination of a table arranged to turn, a conveyer mounted thereon and comprising a boom, the conveyer being capable of an up-and-down movement on the table, and means for automatically imparting said up-and-down movement to the conveyer.

4. The combination of a conveyer, means for automatically swinging the same back and forth, and automatic means for simultaneously raising and lowering the conveyer.

5. The combination of a support, a boom, a hollow trunnion on the boom and mounted on the support, a shaft run loosely through the hollow trunnion, and means on the boom, operated from said shaft.

6. The combination of a table, a conveyer mounted to move vertically thereon, means for turning the table back and forth, a reel, automatic means for driving and reversing the direction of movement of the reel, and a cable in connection with the reel and with the conveyer to impart the continual up-and-down movement to the conveyer.

7. The combination of a conveyer, means for mounting the same to swing horizontally back and forth, means for automatically driving the conveyer-mounting means, and means for automatically imparting an up-and-down movement to the conveyer in addition to the table movement.

8. The combination of a base, a table mounted to turn thereon, means for automatically turning the table back and forth, a conveyer mounted to move vertically on the table, and means for automatically raising and lowering the conveyer in addition to and simultaneously with the movements of the table.

9. The combination of a conveyer, a reel, a cable extending between the conveyer and reel, and a means for driving and automatically reversing the movement of the reel whereby automatically to raise and lower the conveyer.

10. The combination of a conveyer-boom, a bucket mounted to move thereon, a bucket-trip mounted to slide on the boom, a screw engaged with the bucket-trip, and means for driving the screw.

11. The combination of a boom having a guideway therein, a bucket-trip arranged to run in the guideway, a screw lying in the guideway and engaged with the bucket-trip, means for operating the screw, and a bucket mounted to move on the boom past the trip.

12. The combination of a base, a table arranged to turn thereon, means for automatically turning and reversing the movement of the table, a conveyer mounted to swing on the table, means for automatically swinging the conveyer, a bucket-trip mounted to move on the conveyer, and means for automatically moving and reversing the movement of the bucket-trip.

13. The combination of a conveyer, means for mounting the same to move in a curved path and for simultaneously moving the conveyer vertically, a trip device for the purpose specified, and means for mounting the trip device and moving the same on the conveyer simultaneously with the operation thereof.

14. The combination of a base, a table arranged in turn thereon, a circular rack mounted on the base, two gears mounted on the table and arranged to mesh with said rack at opposite sides of the center thereof, and means for alternately rotating said two gears in the same direction, whereby to turn the table back and forth on the base.

15. The combination of a base, a table arranged to turn thereon, a circular rack mounted on the base, two gears mounted on the table and arranged to mesh with said rack at opposite sides of the center thereof, automatic means for alternately driving the said two gears, said means comprising clutch devices for each gear, means for driving each clutch, a connection between the clutches, a block slidably engaged with said connection, a revoluble driving member arranged to strike the block for the purpose specified, and means for shifting the block to engage the driving member.

16. The combination of a base, a table arranged to turn thereon, a circular rack mounted on the base, two gears mounted on the table and arranged to mesh with said rack at opposite sides of the center thereof, automatic means for alternately driving the said two gears, said means comprising clutches for the gears, means for driving the clutches, a connection between the clutches, a block slidably engaged with the connection and having an arm and a shoulder, a revoluble driving member partly embraced by the arm, and means for shifting the block with respect to the driving member.

17. The combination of a base, a table arranged in turn thereon, a circular rack mounted on the base, two gears mounted on the table and arranged to mesh with said rack at opposite sides of the center thereof, automatic means for alternately driving the said two gears, said means comprising clutches for the gears, means for driving the clutches, a connection between the clutches, a block slidably engaged with the connection and having an arm and a shoulder, a revoluble driving member partly embraced by the arm, and means for shifting the block with respect to the driving member, said means for shifting the block comprising a rod mounted on the table, and a cam-like trip mounted on the base and arranged to engage the rod as the table moves the rod past the trip.

18. A trip, comprising a main part or stand, a vertical cam-arm thereon, and a horizontal cam-arm thereon.

19. The combination of a base, a trip thereon, a table arranged to turn on the base, means for driving the table, a member movably mounted on the table and having connection with said means, said member being arranged to engage the trip on the base to operate the member.

20. The combination of a base, a trip on the base, a table arranged to move on the base, an apparatus mounted on the table, means for controlling the said apparatus, and a member in connection with said means and movably mounted on the table, said member being arranged to strike the trip to operate the member.

21. The combination of a conveyer-boom, a trip arranged to move thereon, a screw coacting with the trip, a gear having connection with the screw to drive the same, a driving-shaft, a sleeve arranged thereon, said sleeve having two oppositely-set gears capable of alternately meshing with the first-named gear, and means for shifting said sleeve.

22. The combination of a tubular drive-shaft, a sleeve mounted thereon, a gear carried by the sleeve, a gear coacting with the gear on the sleeve, a rod longitudinally shiftable in the tubular shaft, and a transverse connection between the sleeve and rod, said connection passing through the tubular shaft.

23. The combination of a base, a driven shaft mounted thereon, a stud carried to turn with the shaft, a star-wheel coacting with the stud, and means driven from the star-wheel to turn the table on the base.

24. The combination of a base, a driven shaft mounted thereon, a stud carried to turn with the shaft, a star-wheel coacting with the stud, and means driven from the star-wheel to turn the table on the base, said means including a worm, a worm-wheel meshed therewith, a gear on the base, a gear on the table meshed with the gear on the base, and connections between the worm-wheel and said gear on the table.

25. The combination of a conveyer, means for mounting the same, means for moving the conveyer in a curved path, and means for simultaneously raising and lowering the same, the last-named means including devices for automatically reversing the raising and lowering movement.

26. A conveyer, comprising a boom, a bucket mounted to travel thereon, a movable bucket-dumping trip, and means for automatically moving said trip to dump the bucket at various points along the boom.

In testimony whereof I have signed my name to this specification in the presence of two subscribing witnesses.

JOSEPH WILLEY STEVENS.

Witnesses:
M. D. HICKS,
CLARA A. HICKS.